(12) United States Patent
Hanan

(10) Patent No.: US 11,555,323 B2
(45) Date of Patent: Jan. 17, 2023

(54) DRAIN COVER DETECTION SYSTEMS AND METHODS

(71) Applicant: ZODIAC POOL SYSTEMS LLC, Carlsbad, CA (US)

(72) Inventor: Ethan Hanan, Carlsbad, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 286 days.

(21) Appl. No.: 16/899,754

(22) Filed: Jun. 12, 2020

(65) Prior Publication Data

US 2020/0407995 A1 Dec. 31, 2020

Related U.S. Application Data

(60) Provisional application No. 62/866,108, filed on Jun. 25, 2019.

(51) Int. Cl.
| | |
|---|---|
| E04H 4/16 | (2006.01) |
| C02F 1/00 | (2006.01) |
| G01C 9/00 | (2006.01) |
| G01P 3/00 | (2006.01) |
| C02F 103/42 | (2006.01) |

(52) U.S. Cl.
CPC .......... E04H 4/1654 (2013.01); C02F 1/008 (2013.01); G01C 9/00 (2013.01); G01P 3/00 (2013.01); C02F 2103/42 (2013.01)

(58) Field of Classification Search
CPC .... E04H 4/1654; C02F 1/008; C02F 2103/42; G01C 9/00; G01P 3/00
USPC ......... 210/167.16, 167.17, 143, 739; 15/1.7; 702/153, 176
See application file for complete search history.

(56) References Cited

U.S. PATENT DOCUMENTS

| | | | |
|---|---|---|---|
| 8,141,191 B2 | 3/2012 | Hui | |
| 10,294,686 B1 | 5/2019 | Erlich et al. | |
| 2008/0078039 A1* | 4/2008 | Katz | E04H 4/1654 |
| | | | 15/1.7 |
| 2011/0225718 A1 | 9/2011 | Albaugh, II | |
| 2017/0342733 A1* | 11/2017 | Korenfeld | E04H 4/1654 |
| 2018/0224856 A1* | 8/2018 | Durvasula | G05D 1/027 |

FOREIGN PATENT DOCUMENTS

WO 2017216784 12/2017

OTHER PUBLICATIONS

International Application No. PCT/US2020/037394, Invitation to Pay Additional Fees and Where Applicable Protest Fee dated Sep. 25, 2020, 10 pages.
International Application No. PCTIUS2020/037394, International Preliminary Report on Patentability dated Jan. 6, 2022, 11 pages.
International Application No. PCT/US2020/037394, International Search Report and Written Opinion dated Nov. 18, 2020, 14 pages.

\* cited by examiner

*Primary Examiner* — Fred Prince
(74) *Attorney, Agent, or Firm* — Kilpatrick Townsend & Stockton LLP

(57) ABSTRACT

Systems and methods of detecting when an automatic swimming pool cleaner (APC) has contacted a main drain cover or other object protruding from a surface of a swimming pool are described. An APC may include equipment for detecting a change in its pitch or yaw (or both its pitch and yaw). Changes in pitch and yaw may be determined as a function of time, identifying encounters of the APC with certain protruding objects.

12 Claims, 1 Drawing Sheet

DRAIN COVER DETECTION SYSTEMS AND METHODS

CROSS-REFERENCE TO RELATED APPLICATION

This application claims the benefit of and priority to U.S. Provisional Patent Application Ser. No. 62/866,108, filed Jun. 25, 2019, the entire contents of which are hereby incorporated herein by this reference.

FIELD OF THE INVENTION

This invention relates to automatic swimming pool cleaners (APCs) and more particularly, although not necessarily exclusively, to systems and methods for detecting whether an APC has contacted, encountered, or mounted a drain cover protruding from a surface of a swimming pool.

BACKGROUND OF THE INVENTION

Many swimming pools include main drains typically positioned in floors or bottom surfaces of the pools. Anti-vortex covers often shield swimmers from the main drains. These covers protrude upward from the bottom surfaces and thus tend to create obstacles for passage of APCs travelling along the surfaces.

Indeed, at least some APCs are susceptible to becoming lodged atop the covers or to having their movement impeded thereby. Consequently, certain conventional robotic APCs may include programmed "time out" routines in which movement of an APC is altered if, for example, the APC does not detect contact with a vertical wall within a predetermined period of time. These "time out" routines do not indicate that an APC has become lodged atop a main drain cover; rather, they activate based solely on how much time has elapsed since the APC has contacted a wall. Moreover, because an APC may become lodged prior to elapse of the requisite time period, thereafter activating a "time out" routine might not dislodge the APC.

U.S. Pat. No. 8,141,191 to Hui describes an APC whose ballast is centrally offset "to the right and to the rear" of the cleaner. See Hui, col. 1, ll. 59-62. This offset provides "increased . . . traction in order to run over or climb over . . . various obstacles, including vertical obstacles." See id., ll. 66-67. Also mentioned in the Hui patent is use of an inclination sensor, which activates a motor when an angle of 10-15° off vertical is sensed. See id., col. 6, ll. 47-52. Such activation causes the APC to reverse its motion and thereafter, if necessary, to disable its drive mechanism and pump so that the cleaner "twists and jumps" off the obstacle. See id., col. 6, l. 53 to col. 7, l. 6.

U.S. Patent Application Publication No. 2011/0225718 of Albaugh, II discloses kits and methods seeking to prevent an APC from becoming caught on a main drain cover. The kits include a "clip-on protective device" comprising "an arch shaped flexible member having two resting portions and two mounting hooks" configured to engage apertures of the cover. See Albaugh, II at p. 3, ¶ 0060 (numerals omitted). According to the Albaugh, II application, the shape of the protective device causes an APC contacting it "to tilt to one side regardless of direction of approach or speed and does not allow the suction forces of the [APC] and the main drain to interact to an extent that would cause the [APC] to hang-up over the main drain cover." See id. at pp. 3-4, ¶ 0072.

DETAILED DESCRIPTION

The present invention contemplates detecting when an APC has encountered a main drain cover (or other protruding object) in a swimming pool. Unlike the kits of the Albaugh, II application, no additional arch-shaped product is required to be positioned in the pool. Furthermore, although the present invention may consider elapses of time, no such elapse is necessary for activating an evasive maneuver following detection of a drain cover. Likewise, no offset ballast such as that of the Hui patent is needed, as no "twist[ing] or jump[ing]" of the cleaner necessarily occurs.

In some versions of the invention, an APC may include means for detecting a change in its pitch. Such means may be or comprise a tilt or inclination sensor, an accelerometer, or any other electrical, mechanical, electromechanical, magnetic, or other mechanism for sensing a change in orientation of the cleaner. Other versions of the invention contemplate an APC having means for detecting a change in its yaw. Both pitch-detecting and yaw-detecting means may be incorporated into APCs if appropriate or desired.

Information from the various detecting means may be processed on-board an APC, remotely, or partially on-board and partially remotely. If on-board processing is to occur, an APC may include a suitable processor configured to receive information from the detector(s). If remote processing is to occur, an APC may have wired or wireless transmission capability. APCs additionally may include components typical of their genre such as any or all of wheels, tracks, pumps, motors, floats, weights, bodies, and filters, as examples.

Figure 1:
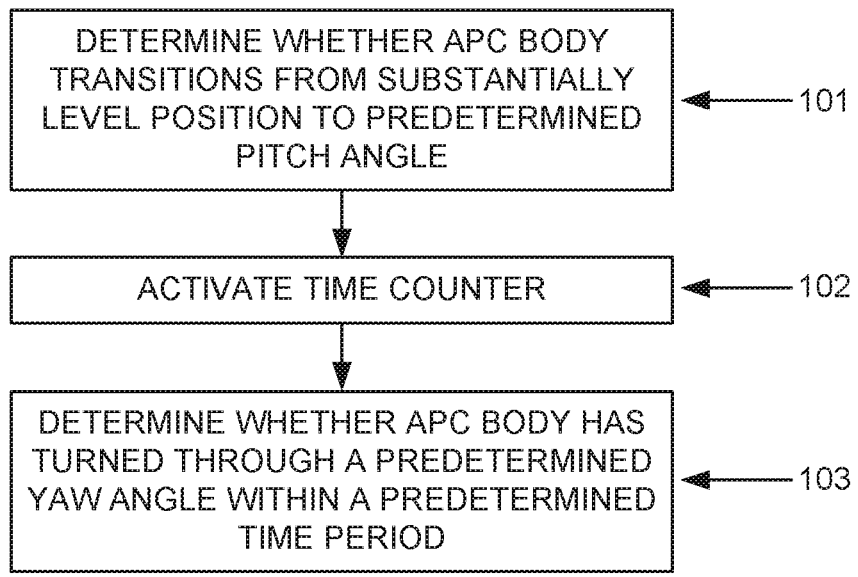
FIG. 1 is a flow chart of a first exemplary process for detecting an encounter of an APC with a main drain cover or other object protruding from a pool surface.

One process of the current invention, as depicted in FIG. 1, may include any or all of these actions:
1. Step 101: Determine whether the body of the APC transitions from a level (or substantially level) position to a pitch angle between, e.g, approximately 5-15°;
2. Step 102: Activate a time counter; and
3. Step 103: Determine whether the body of the APC has returned to a more level position with a pitch angle of, e.g., no greater than 5° within a determined period of time (e.g. no more than 30 seconds.

These sorts of changes of pitch angle may indicate that the APC has climbed onto a drain cover or other obstacle.

Figure 2:
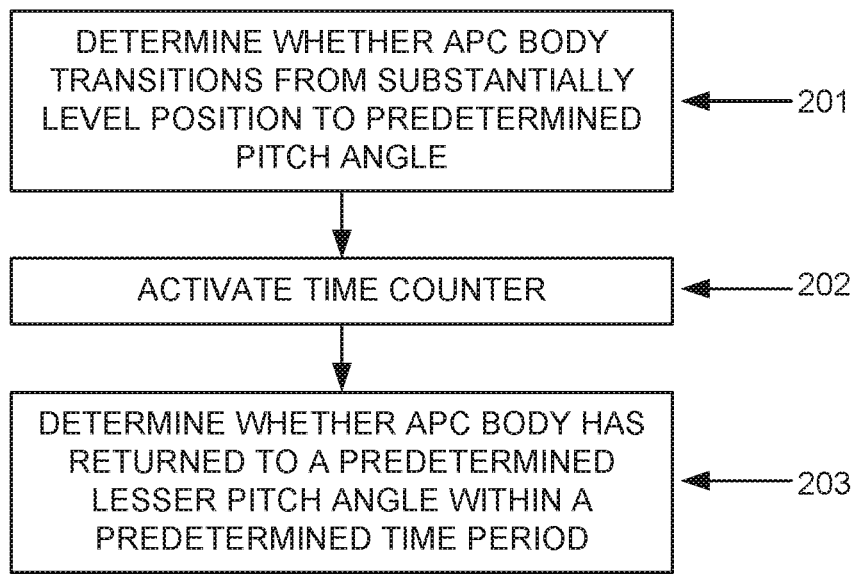
FIG. 2 is a flow chart of a second exemplary process for detecting an encounter of an APC with a main drain cover or other object protruding from a pool surface.

Another process of the invention, as depicted in FIG. 2, may include any or all of these actions:
1. Step 201: Determine whether the body of the APC transitions from a level (or substantially level) position to a pitch angle between, e.g, approximately 5-15°;
2. Step 202: Activate a time counter; and
3. Step 203: Determine whether the body of the APC has turned through a yaw angle of, e.g., no greater than 5° within a determined period of time (e.g. no more than 30 seconds).

Such turning following climbing also may indicate that the APC has encountered a drain cover or similar obstacle.

Exemplary concepts or combinations of features of the invention may include:

A. A method for detecting an encounter of an APC with a main drain cover or other object protruding from a pool surface by determining a change of pitch of the body of the cleaner.
B. A method for detecting an encounter of an APC with a main drain cover or other object protruding from a pool surface by determining a change of yaw of the body of the cleaner.
C. A method for detecting an encounter of an APC with a main drain cover or other object protruding from a pool surface by determining changes of both pitch and yaw of the body of the cleaner.
D. A method according to any of statements A., B., or C. in which the change is (or changes are) determined as a function of time.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

The entire contents of the Hui patent and the Albaugh, II application are incorporated herein by this reference. Further, although applicant has described systems and methods for use with APCs, persons skilled in the relevant field will recognize that the present invention may be employed in other devices such as (but not limited to) manual pool cleaners. Finally, references to "pools" and "swimming pools" herein may also refer to spas or other water containing vessels used for recreation or therapy and for which cleaning is needed or desired.

What is claimed is:

1. A method for detecting an encounter of an automatic swimming pool cleaner with an object protruding from a pool surface, comprising:
   a. causing the automatic swimming pool cleaner to move along the pool surface; and
   b. causing detection of a change of pitch of a body of the automatic swimming pool cleaner from a first position to a predetermined pitch angle;
   c. activating a time counter based on the detected change of pitch; and
   d. causing detection of the encounter of the automatic swimming pool cleaner based on the body returning to a pitch angle less than the predetermined pitch angle within a determined time period.

2. A method according to claim 1 in which the change of pitch is detected as a function of time.

3. A method according to claim 1 in which the step of causing detection of a change of pitch of a body of an automatic swimming pool cleaner comprises:
   (a) detecting transition of the body from a substantially level position as the first position to the predetermined pitch angle, wherein the predetermined pitch angle is between approximately 5-15°; and
   (b) detecting transition of the body to a second pitch angle of no greater than approximately 5° as the pitch angle less than the predetermined pitch angle within the determined time period.

4. A method according to claim 1 in which the object is a main drain cover.

5. A method for detecting an encounter of an automatic swimming pool cleaner with an object protruding from a pool surface, comprising:
   a. causing the automatic swimming pool cleaner to move along the pool surface; and
   b. causing detection of a change of yaw of a body of the automatic swimming pool cleaner from a first position to a predetermined yaw angle;
   c. activating a time counter based on the detected change of yaw; and
   d. causing detection of the encounter of the automatic swimming pool cleaner based on the body returning to a yaw angle less than the predetermined yaw angle within a determined time period.

6. A method according to claim 5 in which the change of yaw is detected as a function of time.

7. A method according to claim 5 in which the step of causing detection of a change of yaw of a body of an automatic swimming pool cleaner comprises detecting whether the body has turned through a yaw angle of no greater than approximately 5° as the predetermined yaw angle within the determined time period.

8. A method according to claim 5 in which the object is a main drain cover.

9. A method for detecting an encounter of an automatic swimming pool cleaner with an object protruding from a pool surface, comprising:
   a. causing the automatic swimming pool cleaner to move along the pool surface;
   b. causing detection of changes of both pitch and yaw of a body of the automatic swimming pool cleaner;
   c. activating a time counter based on the detected change of pitch and the detected change of yaw; and
   d. causing detection of the encounter of the automatic swimming pool cleaner with the object protruding from the pool surface based on the body returning to a lesser pitch angle or a lesser yaw angle within a determined time period.

10. A method according to claim 9 in which the changes of both pitch and yaw are detected as at least one function of time.

11. A method according to claim 9 in which the step of causing detection of changes of body pitch and yaw of a body of an automatic swimming pool cleaner comprises:
   (a) detecting transition of the body from a substantially level position to a pitch angle between approximately 5-15°; and
   (b) detecting whether the body has turned through a yaw angle of no greater than approximately 5° within the determined time period.

12. A method according to claim 9 in which the object is a main drain cover.

* * * * *